United States Patent
Mani et al.

(10) Patent No.: US 10,305,879 B2
(45) Date of Patent: May 28, 2019

(54) RESTRICTING FAKE MULTICAST SERVICE ANNOUNCEMENTS

(71) Applicant: Cisco Technology, Inc., San Jose, CA (US)

(72) Inventors: Selvaraj Mani, Milpitas, CA (US); Deep Preet Singh, San Jose, CA (US); Mahendra Kumar Samarya, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/582,647

(22) Filed: Apr. 29, 2017

(65) Prior Publication Data
US 2018/0316655 A1 Nov. 1, 2018

(51) Int. Cl.
*G06F 7/04* (2006.01)
*G06F 15/16* (2006.01)
*G06F 17/30* (2006.01)
*H04L 29/06* (2006.01)
*H04L 29/12* (2006.01)
*H04L 29/08* (2006.01)

(52) U.S. Cl.
CPC .......... *H04L 63/08* (2013.01); *H04L 61/1511* (2013.01); *H04L 61/1541* (2013.01); *H04L 67/16* (2013.01)

(58) Field of Classification Search
CPC ..... H04L 63/08; H04L 67/16; H04L 61/1541; H04L 61/1511
See application file for complete search history.

(56) References Cited

U.S. PATENT DOCUMENTS

| 8,613,089 | B1 | | 12/2013 | Holloway et al. | |
|---|---|---|---|---|---|
| 9,882,921 | B1 | * | 1/2018 | Kaushik | H04L 63/1441 |
| 2005/0243824 | A1 | * | 11/2005 | Abbazia, Jr. | H04L 12/18 370/390 |
| 2007/0115975 | A1 | * | 5/2007 | Zhang | H04L 12/18 370/390 |
| 2010/0195651 | A1 | * | 8/2010 | Dayong | H04L 12/4641 370/390 |
| 2010/0290463 | A1 | * | 11/2010 | Yao | H04L 12/1877 370/390 |

(Continued)

OTHER PUBLICATIONS

"OIT Filters mDNS (Multicast Domain Name Service) on Ethernet Networks", Princeton University Office of Information Technology—Networking & Monitoring Services, https://www.net.princeton.edu/filters/mdns.html, Jul. 24, 2012, 6 pages, Princeton University.

(Continued)

*Primary Examiner* — Michael S McNally
*Assistant Examiner* — Amie C. Lin
(74) *Attorney, Agent, or Firm* — Behmke Innovation Group LLC; James Behmke; Stephen D. LeBarron (57) ABSTRACT

In one embodiment, a server receives an authentication request from a device in a computer network, and authenticates the device. Then, upon receiving a service announcement from the authenticated device, the server determines authenticity of the service announcement from the authenticated device, and redistributes the service announcement into the computer network only when the service announcement from the authenticated device is an authentic service announcement.

17 Claims, 8 Drawing Sheets

(56) References Cited

U.S. PATENT DOCUMENTS

| | | |
|---|---|---|
| 2014/0359148 A1 | 12/2014 | Cherian et al. |
| 2015/0156630 A1* | 6/2015 | Ankaiah ............... H04L 63/101 |
| | | 726/4 |
| 2015/0312953 A1 | 10/2015 | Wang et al. |
| 2016/0112367 A1 | 4/2016 | Thubert et al. |
| 2016/0294819 A1 | 10/2016 | Salmela et al. |

OTHER PUBLICATIONS

Rafiee, H., "Multicast DNS (mDNS) Threat Model and Security Consideration", DNSSD—Internet-Draft, <draft-rafiee-dnssd-mdns-threatmodel-00>, Jun. 10, 2014, 11 pages, Internet Engineering Task Force Trust.

* cited by examiner

RESTRICTING FAKE MULTICAST SERVICE ANNOUNCEMENTS

TECHNICAL FIELD

The present disclosure relates generally to computer networks, and, more particularly, to restricting fake multicast service announcements.

BACKGROUND

The multicast domain name service (mDNS) protocol is a predominant and lightweight protocol that is used to do service announcements/discovery for devices, such as enterprise Internet of Things (IoT) devices. mDNS is by definition multicast in nature and is limited to a subnet, although there are multiple techniques for service discovery/announce across subnets. When a user on-boards to an IoT network, the client application on the end device may use mDNS to discover the services that are available, such as coffee machines, projectors, printers, conference rooms, etc. Notably, however, the announced services may or may not always be authentic, exposing the network to unwanted vulnerabilities.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a server receives an authentication request from a device in a computer network, and authenticates the device. Then, upon receiving a service announcement from the authenticated device, the server determines authenticity of the service announcement from the authenticated device, and redistributes the service announcement into the computer network only when the service announcement from the authenticated device is an authentic service announcement.

In one embodiment, the server specifically determines authenticity of the service announcement by determining one or more service filter criteria for the authenticated device and comparing the service announcement to the one or more service filter criteria to determine whether the service announcement is an authentic service announcement. In another embodiment, the server specifically determines authenticity of the service announcement based on analyzing traffic from the device.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Figure 1:
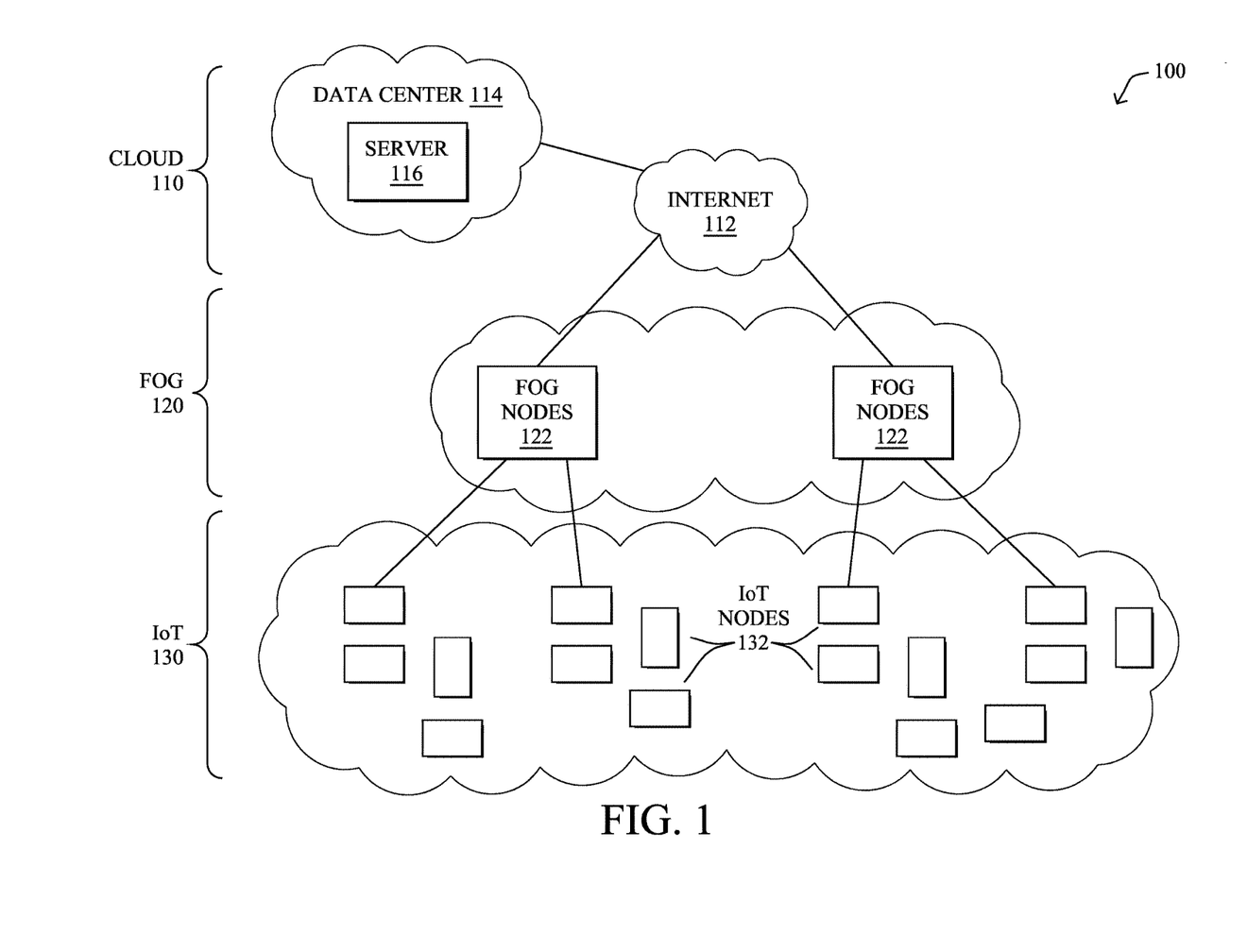
FIG. 1 illustrates an example computer network.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 2:
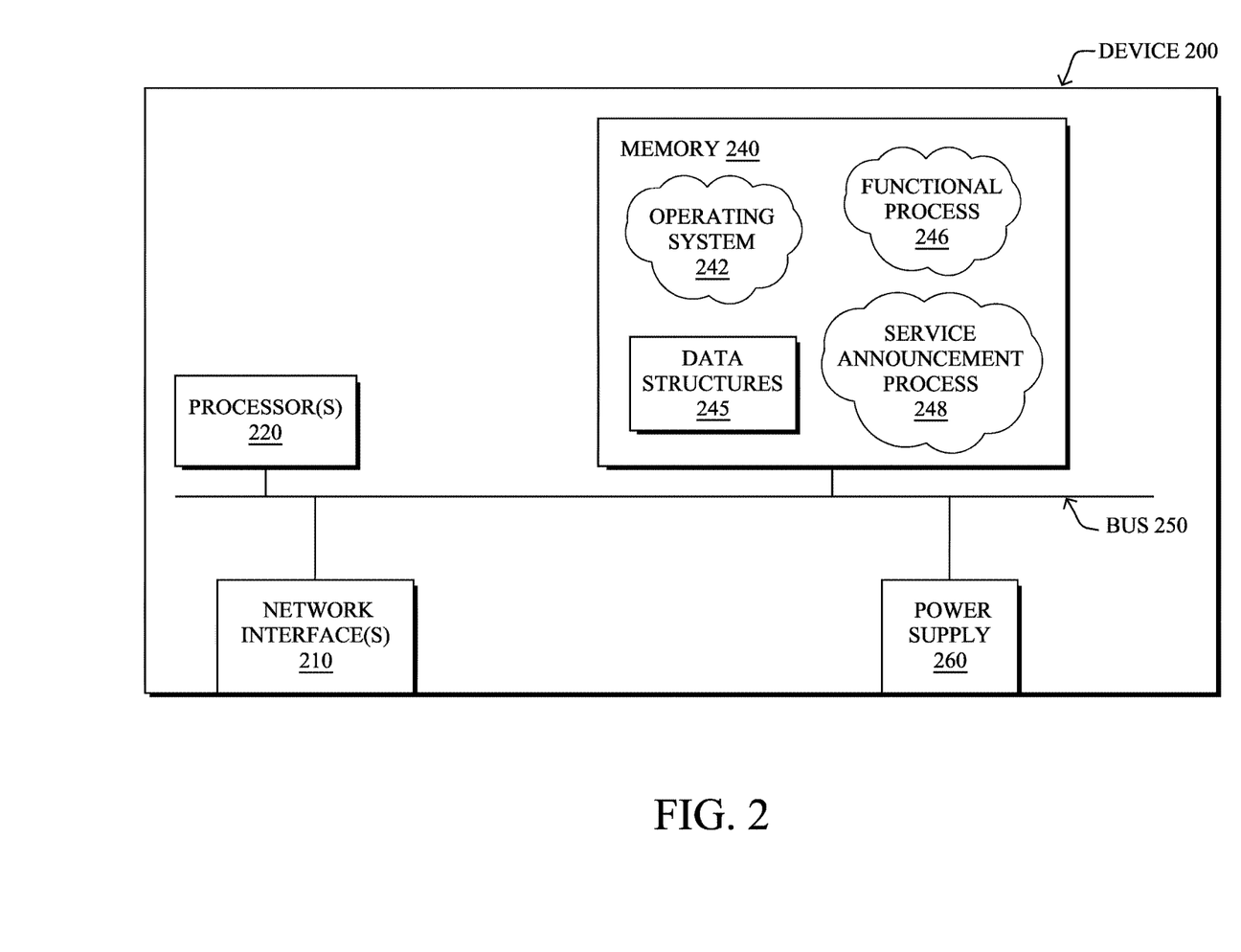
FIG. 2 illustrates an example computing device/node.

FIG. 2 is a schematic block diagram of an example computing device 200 that may be used with one or more embodiments described herein e.g., as any of the devices shown in FIG. 1 above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, WiFi transceivers, cellular transceivers, etc., each to allow device 200 to communicate information to and from a remote computing device or server over an appropriate network. Note, further, that the nodes may have two different types of network connections 210, e.g., wireless and wired/physical connections, and that the view herein is merely for illustration. Also, while the network interface 210 is shown separately from power supply 260, for devices using powerline communication (PLC), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "service announcement" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various embodiments as described below, the illustrative service announcement process 248 may utilize machine learning techniques to perform various aspects of the techniques described below. In general, machine learning is concerned with the design and the development of techniques that take as input empirical data (such as network statistics and performance indicators, or natural language processing (NLP) inputs), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

Restricting Fake Multicast Service Announcements

As noted above, the multicast domain name service (mDNS) protocol is predominantly used for service announcements and/or discovery by devices, such as in an IoT network. For example, when a device/user joins an IoT network, the client application on the device may use mDNS to discover the services that are available in the network. However, it may not be readily apparent if the discovered services are actually authentic (i.e., a real or a "fake" service). Network elements are typically unable to drop/filter out fake services announced by, for example, a malfunctioning device or by a malicious user trying to obtain private information about other users/devices in the network.

The techniques herein enable a device to avoid fake multicast service redistribution across a network using service type restrictions by an authentication, authorization, and accounting (AAA) component and/or by traffic pattern analytics on a network element. In particular, in some embodiments, the techniques provide secure registration-based service announcements (for prevention of non-authentic services) and registration-less analytical rule-based service evaluation (for avoidance of non-authentic services) to avoid the distribution of fake multicast traffic across the network and to thus provide secure services. The present techniques not only permit or deny specific service types, but further provide validation of permitted services and permit/deny a service type by a specific user/device.

Specifically, according to one or more embodiments of the disclosure as described in detail below, a server receives an authentication request from a device in a computer network, and authenticates the device. Then, upon receiving a service announcement from the authenticated device, the server determines authenticity of the service announcement from the authenticated device, and redistributes the service announcement into the computer network only when the service announcement from the authenticated device is an authentic service announcement.

Illustratively, the techniques described herein may be performed by hardware, software, and/or firmware, such as in accordance with the service announcement process 248, which may include computer executable instructions executed by the processor 220 to perform functions relating to the techniques described herein, e.g., in conjunction with corresponding processes of other devices in the computer network as described herein.

Figure 3:
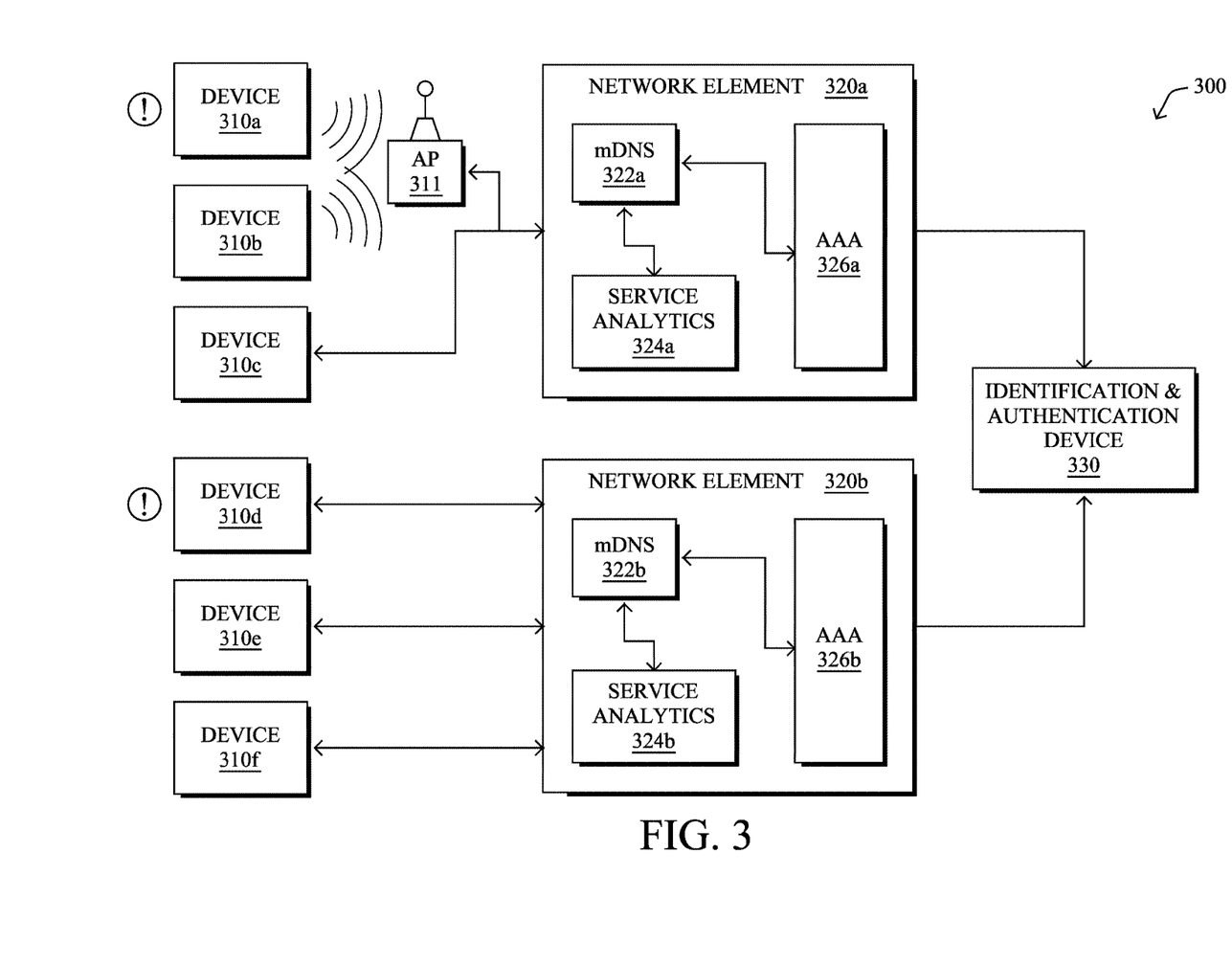
FIG. 3 illustrates an example environment for service announcements.

Operationally, FIG. 3 illustrates an example system 300 that may include one or more network elements 320 (e.g., servers, routers, switches, or other network elements) connected to various devices 310 (e.g., user devices, end devices, personal computers, client devices, printers, cameras, sensors, etc.). For example, as shown, network element 320a may be in communication with one or more devices 310a-310c, including devices 310a and 310b wirelessly connected to wireless access point (AP) 311, and network element 320b may be in communication with devices 310d-310f.

System 300 may further include additional components and devices, in various embodiments of the present disclosure. In particular, system 300 may include mDNS component 322 (e.g., an mDNS proxy), service analytics component 324, and authentication, authorization, and accounting (AAA) components 326. While these components are shown, in the embodiment illustrated in FIG. 3, as components of the network elements/servers 320 (centralized), it would be understood that the components may also be distributed among different servers. System 300 may further include an identification and authentication device 330 (e.g., an identity services engine or "ISE" device) in communication with the network elements/servers 320, which may be configured to provide one or more service filter criteria, such as attribute-value pairs (av-pairs), that the server may use to compare against service announcements in order to determine authenticity, as described in detail below.

According to one or more embodiments of the present disclosure, the techniques herein determine the authenticity of service announcements from devices that may have already been authenticated. That is, an authenticated device may then be maliciously configured or malfunctioning to send out inauthentic service announcements. Illustratively, as described below, the authenticity of a service announcement may be determined through either a protective method that uses secure registration (or) provisioning of services (e.g., by using the AAA components) for each client, or else through an avoidance method that uses posturing or data analytic modules for services.

Figure 4:
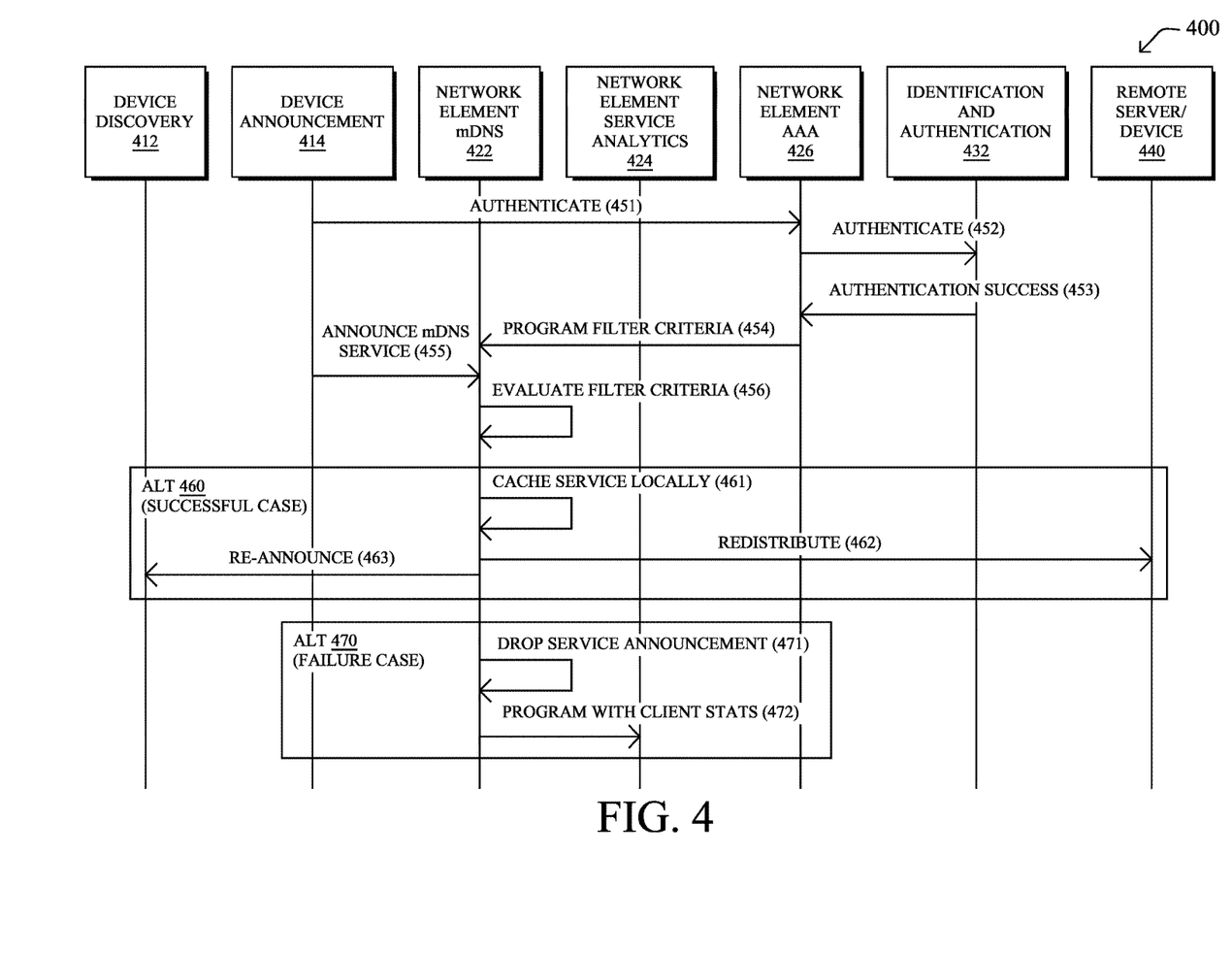
FIG. 4 illustrates an example messaging diagram of a service announcement process that restricts fake multicast service announcements.

FIG. 4 illustrates an example embodiment 400 for the first method mentioned above, that is using secure registration or provisioning of services to assess the authenticity of a service announcement from device in the network. For example, a network element/server 320 (e.g., AAA component 326 of network element 320) may be pre-provisioned, such as by a network security administrator (e.g., globally through identification and authorization device 330), with appropriate policies as service filter criteria, which may be, in particular, attribute-value pairs. (Note that the service filter criteria, either entirely or else only for new dynamic services, may be added to the local network element filter cache instead of adding them globally from an identification and authorization device 330.) When a user/device is successfully authenticated against the AAA component of the server, the network element/server will receive the filter criteria (attribute-value pairs). Illustrative filter criteria may comprise one or more allowed services, a set number of services allowed by a user/device, and/or a rediscover timeout to resend the discovery request to the client attributes (after which the device must be rediscovered). In some embodiments, the service filter criteria may be contained in a filter criteria cache of mDNS component 322, so that, when the mDNS proxy of a network element/server sees any new service announcement by a device, the announcement can be cross checked against the filter criteria. If it is determined by the server that the announcement satisfies the filter criteria (e.g., a matching attribute-value pair is found) then the service may be redistributed across network. However, if the filter criteria are not satisfied, then the announced service may be discarded/dropped at the mDNS proxy so that the service will not be re-advertised to the other networks/devices. If the threshold increases, the multicast may be disabled for the user/device. (Note that filter criteria may also be negative, meaning services that are not allowed, in which case satisfying filter criteria would thus be not matching any disallowed services, accordingly).

As shown in FIG. 4, a device announcement component 414 of a device 310 in the network may send an authentication request 451 to an AAA component 426 (e.g., AAA 326 of a network element/server 320), which may forward/confirm the authentication by communication 452 with an identification and authentication device 432 (330 in FIG. 3), and subsequent authentication success 453. For example, through the authentication success, the network element/server may receive service filter criteria including attribute-value pairs from the identification and authentication device 432, and programs mDNS component 422 (322 in FIG. 3) with the filter criteria (communication 454). In this way, the server (particularly mDNS component) may be provisioned to include filter criteria for evaluation and authentication of new or suspect service announcements.

In particular, as shown in FIG. 4, if a device multicasts a service announcement 455, the mDNS component of the server may evaluate the announcement by comparing to the programmed filter criteria, in step 456. If successful (e.g., alternative 460), the service may be cached locally (461), redistributed in message 462 (such as to remote server/device 440), and a re-announcement 463 made to discovery service 412 of the announcing device. However, if the evaluation is unsuccessful and it has been determined by the server that the service announcement is not authentic (e.g., alternative 470), the service announcement may be dropped in step 471 by mDNS component 422 of the network element. In some embodiments, a program with client statistics 472 may also be provided to service analytics component 424 (324 of FIG. 3) of the network element.

The techniques related to FIG. 4 may be deployed particularly for small form factor network elements, where the service can be pre-provisioned per client in the network during authentication using the attribute-value pairs. This way, a network administrator can restrict the type and number count of services per client in the network so one can protect the service by not flooding the network with the fake services.

In some embodiments, it may be inconvenient or difficult to pre-provision allowed services on the server (e.g., the AAA component of the server). In this case, the local service analytics component 324 of the server (which may be a posture server or data glean analytical module) may be used. The service announcement may be temporarily added to the mDNS proxy cache with a reduced time-to-live (TTL) but not advertised to other networks. The service would therefore only be available to the local network until the service is declared authentic by the server. In particular, the service analytics component of the server may collect detailed information about the services from the client device and begin analysis of the traffic from the device. For example, the server may analyze the traffic on the ports listed by the service announcement through the discovery packet to the client device and may request data from the service. If an anomaly is detected, the service analytics component may inform the mDNS proxy of the server to add a filter rule and the service may be deleted from the local database and re-announced with a zero-TTL.

Figure 5:
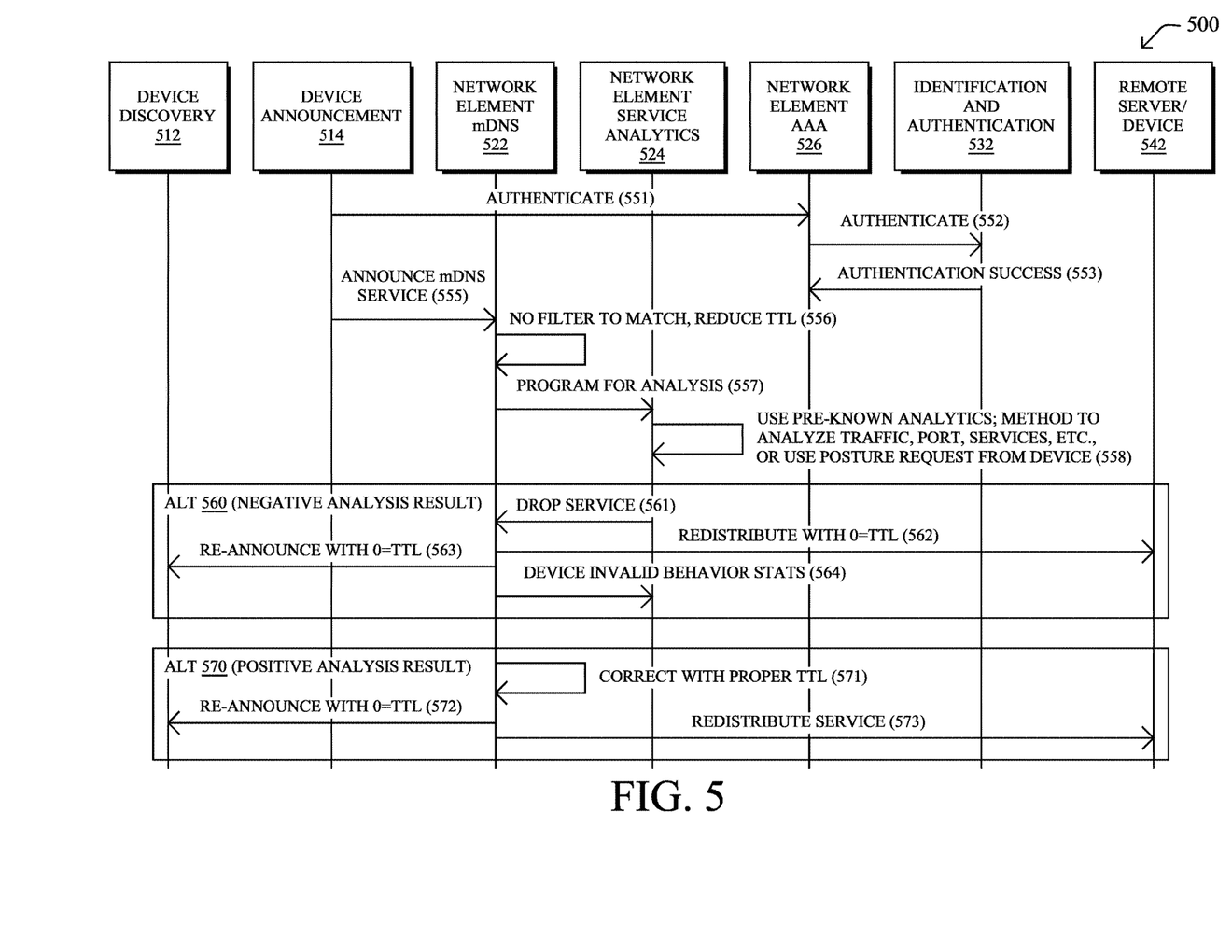
FIG. 5 illustrates another example messaging diagram of a service announcement process that restricts fake multicast service announcements.

This is shown in more detail in the embodiment 500 in FIG. 5. In particular, authentication request 551 may be authenticated through communication 552 and 553, similar to the authentication described above. Note that in one embodiment there is no option for service filters (attribute-value pairs), while in another embodiment the authentication success 553 specifically indicates that no attribute-value pair (or service filter) is known. In either case, upon receipt of the multicast service announcement 555 by mDNS component 522 of the network element/server, the server may determine that there is no filter criteria match and may reduce the TTL in step 556 (e.g., limiting the amount of damage a fake service announcement could inflict to the system). mDNS component 522 may then program (communication 557) the service analytics component 524 for analysis of the service announcement. In step 558, the service analytics component may then analyze the traffic, port, service, etc. relating to the device announcement using, for example, pre-known analytics or other available methods, or using posture requests from the device.

In one embodiment, if the analysis result indicates that the traffic is inconsistent with the device or otherwise anomalous (e.g., a negative analysis result in alternative 560), service analytics component may communicate (561) to the mDNS component 522 that the service should be dropped. The mDNS component may then 1) redistribute the service announcement 562, such as to remote server/device 542, with a zero TTL, 2) may re-announce (563) the service to device discovery 512 with a zero TTL, and/or 3) may send device invalid behavior statistics 562 to the service analytics component 524.

In another embodiment, if the analysis result is positive indicating that the service announcement/device is authentic (e.g., alternative 570), the mDNS component may correct the service with a proper TTL (571). The server may then re-announce the service to device discovery 512 (message 572), and/or redistribute the service announcement (message 573), such as to remote server/device 542.

The techniques of FIG. 5 may be particularly useful in off-box deployment or for high form factor network elements. The analytics module 324 of the network element (e.g., Network Based Application Recognition (NBAR), dynamic network analysis, machine learning, etc.) can be used to analyze the client/device, such as the exposed ports and data traffic originated from the exposed ports.

Figure 6:
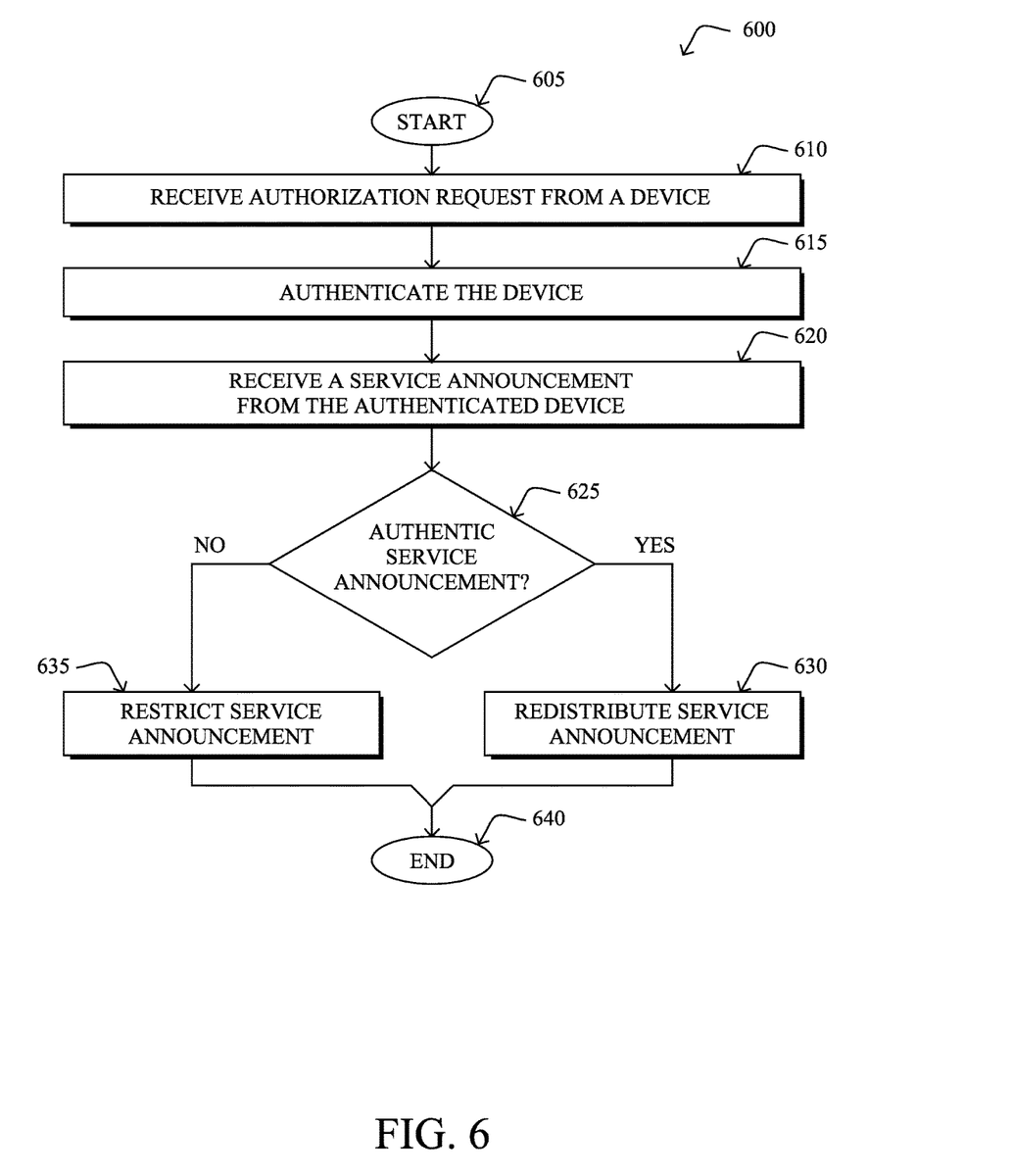
FIG. 6 illustrates an example procedure for restricting fake multicast service announcements.
Figure 7:
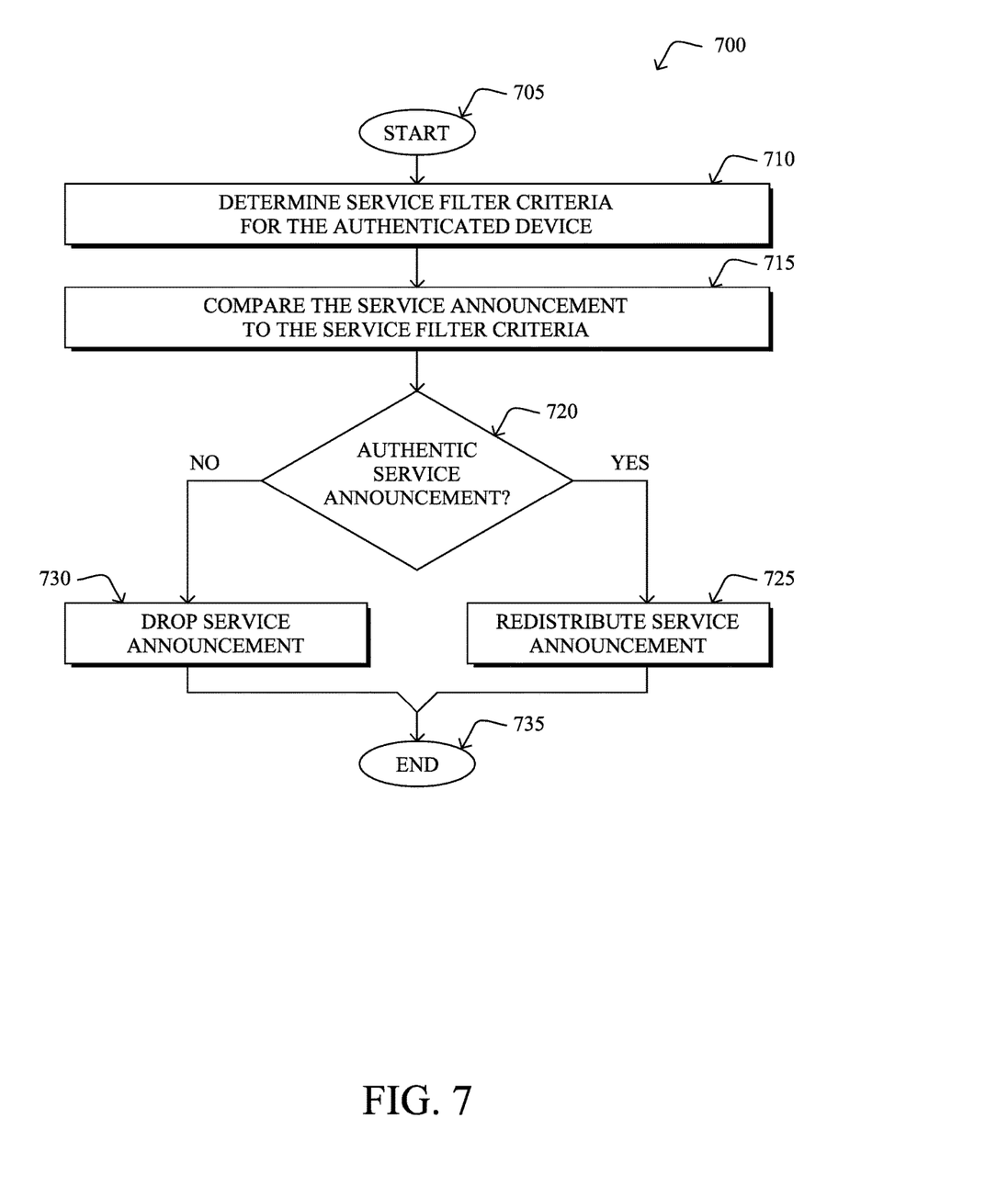
FIG. 7 illustrates another example procedure for restricting fake multicast service announcements, particularly based on pre-configured filter criteria.
Figure 8:
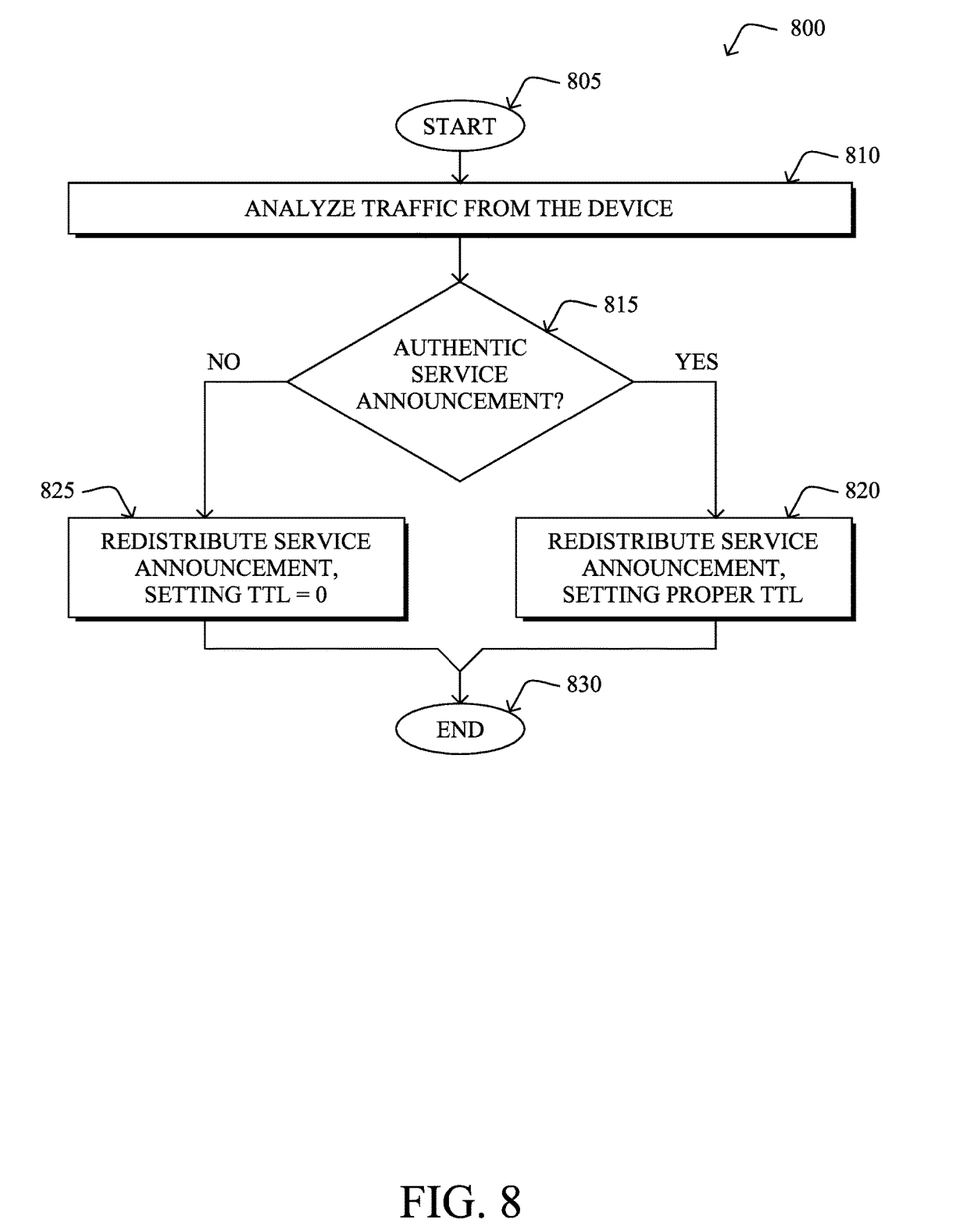
FIG. 8 illustrates yet another example procedure for restricting fake multicast service announcements, particularly based on traffic analysis.

FIGS. 6-8 illustrate example simplified procedures for restricting fake multicast service announcements in a network in accordance with one or more embodiments described herein. For example, a non-generic, specifically configured device (e.g., device 200, such as a network element 320) may perform procedures 600, 700, and 800 by executing stored instructions (e.g., process 248).

In particular, procedure 600 may start at step 605, and continues to step 610, where, as described in greater detail above, a server may receive an authentication request from a device in a computer network. In some embodiments, the device is an Internet of Things (IoT) device. Furthermore, the server may be a network entity comprising an mDNS component, a service analytics component, and/or an AAA component, which may all be located on the same server or may be distributed over different servers.

In step 615, as described in greater detail above, the server may authenticate the device. In some embodiments, authenticating may be based on communication with a remote authentication device, such as an identification and authentication device. For example, a secure registration or provision of services may be used to determine the authenticity of the device. In some embodiments, the server may be pre-provisioned with one or more service filter criteria through this authentication as described above, such as attribute-value pairs.

In step 620, the server may receive a service announcement from the authenticated device. As described in greater detail above, the service announcement is illustratively an mDNS service discovery message, though other service announcement protocol messages may be used.

As noted herein, the authenticity of the service announcement from the authenticated device may be in question. As such, in step 625, the server may determine authenticity of the service announcement from the authenticated device. For example, (and as described in detail in procedures 700 and 800 of FIGS. 7-8 below), the service announcement may be evaluated by comparing it to one or more of the programmed service filter criteria in order to determine if a matching attribute-value pair can be found, or else may be limited until a further analysis of traffic for the service can be analyzed.

In step 630, if (and only if) the service announcement from the authenticated device has been determined to be an authentic service announcement, then the server may redistribute the service announcement into the computer network. In step 640, on the other hand, if the server has determined that the service announcement is not authentic (inauthentic), the server may restrict the deemed "fake" service announcement. For example, the server may prevent redistribution by either dropping the service announcement (FIG. 7 below), or by setting a TTL to zero (FIG. 8 below). Note that in some embodiments, the server may also provide statistics of inauthentic service announcements to a service analytics component as part of step 640. The illustrative simplified procedure 600 may then end at step 645, notably with the option to continue monitoring incoming service announcements from an authenticated device.

As noted, FIG. 7 illustrates an example simplified procedure for restricting fake multicast service announcements, particularly for determining authenticity of a service announcement from an authenticated device (e.g., steps 625-on in greater detail according to one particular embodiment). Procedure 700 may start at step 705 and continues to step 710, where, as described in greater detail above, one or more service filter criteria may be determined for the authenticated device. The one or more service filter criteria may comprise one or more allowed services, a set number of allowed services, and/or a rediscover timeout after which the device must be rediscovered. In some embodiments, the one or more service filter criteria may be received from an authentication device or may be determined by receiving a local configuration of one or more service criteria on the server.

In step 715, the server may compare the service announcement to the one or more service filter criteria. For example, the server may compare an allowed service for the device to the announced service, or any other filter criteria (e.g., attribute-value pairs) may be compared. The server may then determine in step 720 whether the service announcement is an authentic service announcement based on the comparing. For example, in step 725 the service announcement may be redistributed into the computer network when the service announcement from the authenticated device is an authentic service announcement (and also, optionally, the service may also be re-announced to the device). Conversely, if the service announcement from the authenticated device is determined to not be an authentic service announcement in step 720, then the service may be dropped in step 730, thus preventing redistribution into the network. Procedure 700 may end at step 735.

FIG. 8, on the other hand, illustrates an alternative (or additional) example simplified procedure for restricting fake multicast service announcements, particularly for determining authenticity of a service announcement from an authenticated device (e.g., steps 625-on in greater detail according to another particular embodiment). Procedure 800, in particular, may start at step 805, and continues to step 810, where, as described in greater detail above, determining the authenticity of a service announcement comprises analyzing traffic from the authenticated device. Note that during this time, in some embodiments, a reduced TTL may be set at the server for the service announcement. In step 815, as described in greater detail above, a determination may be made whether the service announcement is an authentic service announcement based on the analyzing. For example, an analysis may include the quantity and/or type of traffic compared to the type of device. In some embodiments, analysis of the traffic may lead to a determination of anomalous behavior.

If analysis of the traffic in step 815 determines that the service announcement from the authenticated device is an authentic service announcement, then in step 820 the service announcement may be redistributed into the computer network, illustratively setting a proper/sufficient time-to-live (TTL). Otherwise, if analysis of the traffic determines the service announcement is not authentic in step 815, then in step 825 the service announcement may be redistributed into the computer network (e.g., and re-announced to the sending device) with a TTL set to zero. The TTL of zero thus announces to the network that this service is no longer valid, and should not be used. Illustrative procedure 800 may then end at step 830.

It should be noted that while certain steps within procedures 600-800 may be optional as described above, the steps shown in FIGS. 6-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-800 are described separately, certain steps from each procedure may be incorporated into each other procedure, and the procedures are not meant to be mutually exclusive.

The techniques described herein, therefore, restrict fake multicast service announcements in computer networks. Network resources may therefore be protected from fake multicast service announcements, which is particularly important in large enterprise IoT networks. In this way, authentic and secured services may be provided for IoT devices in the network. The techniques described herein may also be readily implemented on the network element/server with limited resource requirements.

While there have been shown and described illustrative embodiments that provide for restricting fake multicast service announcements, it is to be understood that various other adaptations and modifications may be made within the spirit and scope of the embodiments herein. For example, while certain embodiments are described herein with respect to "IoT" networks in particular, the techniques are not limited as such and may be used with computer networks, generally, in other embodiments. In addition, while certain devices are shown, such as routers, access points, gateways, etc., other suitable devices may be used, accordingly. That is, the embodiments have been shown and described herein with relation to specific network configurations (orientations, topologies, protocols, terminology, etc.), and particularly to mDNS-related computing. However, the embodiments in their broader sense are not as limited, and may, in fact, be used with other types of networks and protocols, regardless of their nomenclature or underlying communication protocol.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, at a server, an authentication request from a device in a computer network;
authenticating, at the server, the device;
after the device has been authenticated, receiving, at the server, service filter criteria that indicates to the server at least one or more types of services that the authenticated device is allowed to perform, a set number of allowed services for the authenticated device, and a rediscover timeout after which the device must be rediscovered;
receiving, at the server, a service announcement from the authenticated device, wherein the service announcement includes a type of service the authenticated device offers;
determining, by the server, authenticity of the service announcement from the authenticated device, wherein the determining identifies when the service announcement is fake by comparing the type of service in the service announcement to the received at least one or more types of services in the service filter criteria that the authenticated device is allowed to perform, the set number of allowed services for the authenticated device, and the rediscover timeout;
redistributing, from the server, the service announcement into the computer network only when the type of service in the service announcement matches the received at least one or more types of services in the service filter criteria that the authenticated device is allowed to perform, is within the set number of allowed services for the authenticated device, and the rediscover timeout has not expired; and
dropping, by the server, the service announcement when the type of service in the service announcement does not match the received at least one or more types of services in the service filter criteria that the authenticated device is allowed to perform.

2. The method as in claim 1, wherein the authenticating the device is based on communication with an authentication device, and wherein the receiving the service filter criteria for the authenticated device comprises:
receiving one or more service filter criteria from the authentication device.

3. The method as in claim 1, wherein the receiving the service filter criteria comprises:
receiving local configuration of one or more service criteria on the server.

4. The method as in claim 1, wherein the determining the authenticity of the service announcement comprises:
analyzing traffic from the device; and
determining that the service announcement is an authentic service announcement based on the analyzing;
wherein the redistributing the service announcement into the computer network comprises setting a sufficient time-to-live (TTL) only when the service announcement from the authenticated device is an authentic service announcement; and
wherein the redistributing the service announcement into the computer network comprises setting a zero TTL when the service announcement from the authenticated device is not an authentic service announcement.

5. The method as in claim 4, further comprising:
setting a reduced TTL at the server for the service announcement during the analyzing.

6. The method as in claim 1, further comprising:
providing statistics of inauthentic service announcements to an analytics service.

7. The method as in claim 1, wherein the authenticating the device is based on communication with a remote authentication device.

8. The method as in claim 1, wherein the service announcement is a multicast domain name service (mDNS) service discovery message.

9. The method as in claim 1, wherein the device is an Internet of Things (IoT) device.

10. An apparatus, comprising:
one or more network interfaces configured to communicate in a computer network;
a processor coupled to the network interfaces and adapted to execute one or more processes; and
a memory configured to store a process executable by the processor, the process when executed operable to:
receive an authentication request from a device in a computer network;
authenticate the device;
after the device has been authenticated, receive service filter criteria that indicates to the server at least one or more types of services that the authenticated device is allowed to perform, a set number of allowed services for the authenticated device, and a rediscover timeout after which the device must be rediscovered;
receive a service announcement from the authenticated device, wherein the service announcement includes a type of service the authenticated device offers;
determine authenticity of the service announcement from the authenticated device, wherein the determining identifies when the service announcement is fake by comparing the type of service in the service announcement to the received at least one or more types of services in the service filter criteria that the authenticated device is allowed to perform, the set number of allowed services for the authenticated device, and the rediscover timeout;
redistribute, the service announcement into the computer network only when the type of service in the service announcement matches the received at least one or more types of services in the service filter criteria that the authenticated device is allowed to perform, is within the set number of allowed services for the authenticated device, and the rediscover timeout has not expired; and
drop the service announcement when the type of service in the service announcement does not match the received at least one or more types of services in the service filter criteria that the authenticated device is allowed to perform.

11. The apparatus as in claim 10, wherein the process, when executed to determine authenticity of the service announcement, is further operable to:

analyze traffic from the device; and determine that the service announcement is an authentic service announcement based on the analyzing;

wherein the redistributing the service announcement into the computer network comprises setting a sufficient time-to-live (TTL) only when the service announcement from the authenticated device is an authentic service announcement; and wherein the redistributing the service announcement into the computer network comprises setting a zero TTL when the service announcement from the authenticated device is not an authentic service announcement.

12. The apparatus as in claim 10, wherein the authenticate the device is based on communication with an authentication device, and wherein the receive the service filter criteria for the authenticated device comprises:

receiving one or more service filter criteria from the authentication device.

13. The apparatus as in claim 10, wherein the receive the service filter criteria comprises:

receiving local configuration of one or more service criteria on the server.

14. A tangible, non-transitory, computer-readable medium storing program instructions that cause a computer to execute a process comprising:

receive an authentication request from a device in a computer network;

authenticate the device;

after the device has been authenticated, receive service filter criteria that indicates to the server at least one or more types of services that the authenticated device is allowed to perform, a set number of allowed services for the authenticated device, and a rediscover timeout after which the device must be rediscovered;

receive a service announcement from the authenticated device, wherein the service announcement includes a type of service the authenticated device offers;

determine authenticity of the service announcement from the authenticated device, wherein the determining identifies when the service announcement is fake by comparing the type of service in the service announcement to the received at least one or more types of services in the service filter criteria that the authenticated device is allowed to perform, the set number of allowed services for the authenticated device, and the rediscover timeout;

redistribute, the service announcement into the computer network only when the type of service in the service announcement matches the received at least one or more types of services in the service filter criteria that the authenticated device is allowed to perform, is within the set number of allowed services for the authenticated device, and the rediscover timeout has not expired; and drop the service announcement when the type of service in the service announcement does not match the received at least one or more types of services in the service filter criteria that the authenticated device is allowed to perform.

15. The tangible, non-transitory, computer-readable medium as in claim 14, wherein the process, when executed to determine authenticity of the service announcement, further comprises:

analyze traffic from the device; and determine that the service announcement is an authentic service announcement based on the analyzing;

wherein the redistributing the service announcement into the computer network comprises setting a sufficient time-to-live (TTL) only when the service announcement from the authenticated device is an authentic service announcement; and wherein the redistributing the service announcement into the computer network comprises setting a zero TTL when the service announcement from the authenticated device is not an authentic service announcement.

16. The tangible, non-transitory, computer-readable medium as in claim 14, wherein the authenticate the device is based on communication with an authentication device, and wherein the receive the service filter criteria for the authenticated device comprises: receiving one or more service filter criteria from the authentication device.

17. The tangible, non-transitory, computer-readable medium as in claim 14, wherein the receive the service filter criteria comprises:

receiving local configuration of one or more service criteria on the server.

* * * * *